United States Patent
Masse et al.

(10) Patent No.: US 9,032,786 B2
(45) Date of Patent: May 19, 2015

(54) METHOD FOR MONITORING A CONTROL DEVICE OF A FUEL METERING VALVE OF A TURBOJET ENGINE

(71) Applicant: SNECMA, Paris (FR)

(72) Inventors: Jean-Remi Andre Masse, Moissy-Cramayel Cedex (FR); Benjamin Pierre Lamoureux, Moissy-Cramayel Cedex (FR); Hicham Janati Idrissi, Longjumeau (FR); Francis Marquisseau, Bourg la Reine (FR); Aziz Sif, Vigneux sur Seine (FR)

(73) Assignee: SNECMA, Paris (FR)

( * ) Notice: Subject to any disclaimer, the term of this patent is extended or adjusted under 35 U.S.C. 154(b) by 284 days.

(21) Appl. No.: 13/692,684

(22) Filed: Dec. 3, 2012

(65) Prior Publication Data

US 2013/0139520 A1 Jun. 6, 2013

(30) Foreign Application Priority Data

Dec. 5, 2011 (FR) ..................... 11 61175

(51) Int. Cl.
*G01M 15/14* (2006.01)
*F02C 7/232* (2006.01)
*F02C 9/26* (2006.01)

(52) U.S. Cl.
CPC ................. *F02C 7/232* (2013.01); *F02C 9/263* (2013.01); *F05D 2260/80* (2013.01)

(58) Field of Classification Search
CPC .................................................. G01M 15/14
USPC ........................................ 73/112.01, 112.03
See application file for complete search history.

(56) References Cited

U.S. PATENT DOCUMENTS

| 4,513,782 A | 4/1985 | Contartese et al. |
| 4,745,739 A | 5/1988 | Bezard et al. |

(Continued)

FOREIGN PATENT DOCUMENTS

| DE | 198 28 816 A1 | 12/1999 |
| EP | 0 075 507 A1 | 3/1983 |

(Continued)

OTHER PUBLICATIONS

French Preliminary Search Report and Written Opinion issued Jul. 16, 2012 in corresponding French Application No. 11 61175 filed on Dec. 5, 2011 (with an English Translation of Categories).

(Continued)

*Primary Examiner* — Eric S McCall
(74) *Attorney, Agent, or Firm* — Oblon, McClelland, Maier & Neustadt, L.L.P.

(57) ABSTRACT

A method for monitoring a control device of a fuel metering valve of an aircraft turbojet engine, the control device supplying a control current to a servo valve in order to modify the position of the fuel metering valve. The method includes determining the position of the fuel metering valve during a flight of the aircraft, determining the travelling speed of the fuel metering valve, and determining the control current when the travelling speed of the fuel metering valve is zero. A mean control current is calculated when the travelling speed of the fuel metering valve is zero, the mean control current forming an indicator of deterioration of the control device. The deterioration indicator is compared with a reference base of indicators with deterioration so as to infer the type of deterioration from it, and an abnormality score is calculated for the deterioration indicator. The abnormality score is compared with a decision threshold of abnormality characteristic of the type of deterioration, and an alarm is released in case of violation of the decision threshold of abnormality.

6 Claims, 2 Drawing Sheets

(56) References Cited

U.S. PATENT DOCUMENTS

| | | |
|---|---|---|
| 6,298,940 B1 | 10/2001 | Bohner et al. |
| 7,409,855 B2 * | 8/2008 | Flint ............ 73/114.39 |
| 2006/0041339 A1 | 2/2006 | Silvestro |
| 2007/0144246 A1 * | 6/2007 | Flint ............ 73/119 A |
| 2007/0261384 A1 * | 11/2007 | Flint et al. ............ 60/39.281 |
| 2010/0257867 A1 * | 10/2010 | Aurousseau et al. ........ 60/779 |
| 2011/0307220 A1 | 12/2011 | Lacaille |
| 2012/0109486 A1 | 5/2012 | Ecoutin et al. |
| 2013/0179097 A1 * | 7/2013 | Masse et al. ............ 702/55 |

FOREIGN PATENT DOCUMENTS

| | | |
|---|---|---|
| EP | 0 190 963 A1 | 8/1986 |
| EP | 1 335 257 A1 | 8/2003 |
| FR | 2 939 924 A1 | 6/2010 |

OTHER PUBLICATIONS

U.S. Appl. No. 13/692,730, filed Dec. 3, 2012, Masse, et al.

* cited by examiner

METHOD FOR MONITORING A CONTROL DEVICE OF A FUEL METERING VALVE OF A TURBOJET ENGINE

FIELD OF THE INVENTION

The present invention relates to the general field of methods for monitoring failures in a turbojet engine. The invention notably relates to a method for monitoring a control device of a fuel metering valve of a turbojet engine.

BACKGROUND OF THE INVENTION

A turbojet engine typically includes actuators with servo valve intended to drive variable geometries of the turbojet engine.

"Variable geometries" of the turbojet engine should here be understood as components of the engine or from its environment the dimensions, forms, positions and/or speeds of which may be modified according to detected events or operating parameters of the engine. Examples of "variable geometries" are: compressor variable vanes, compressor bleed valves, turbine blade tips and a fuel metering valve.

Typically, these actuators are controlled by the electronic control module of the engine control system or EEC (for "Electronic Engine Control") so as to adapt the variable geometries to the scenario of the flight. The monitoring is ensured through feedback loops.

So, it is quite well understandable that monitoring the actuators of variable geometries in a turbojet engine is critical in terms of availability and efficiency of the turbojet engine.

The deteriorations of these actuators are notably translated into positions and/or dimensions of the components of the turbojet engine which do not comply with the commands of the ECU in steady state, or into a slow response from these components to these commands in transient state. These deteriorations are beginnings of a failure because generally they either are compensated by the feedback loops of the actuators or have no notable consequence other than a reconfiguration (for instance a change of active control channel) at first.

However, after a while, when these deteriorations persist and worsen, they cannot be compensated any more because the control equipments are limited. So, these deteriorations can, as a consequence, make the turbojet engine inoperative or non-effective. This can be translated into a message of failure issued by the ECU. The detection of these deteriorations is thus too late because it is achieved only when the actuator is out of order.

A particular type of deterioration is the drift of the rest current of a servo valve controlling a fuel metering valve of a turbojet engine.

FIG. 1 is a graph which shows an operating curve of a servo valve. More precisely, the graph of FIG. 1 illustrates the evolution of the hydraulic flow rate Q supplied to a jack by the servo valve according to the control current Icmd. In FIG. 1, Imax is the maximal value of the control current Icmd that the ECU is able to supply.

Curve 20 corresponds to a nominal state of the servo valve and shows that the rest current of the servo valve, i.e. the control current necessary to maintain the jack in a definite position, has a non-zero value I0. In the nominal state, current Imax makes it however possible to supply the maximal hydraulic flow rate Qmax.

Curve 21 shows a non-nominal state of the servo valve, for instance a state after ageing. It can be seen that the rest current has a value I1 which is greater than I0. In other words, there was a drift of the rest current of the servo valve. Furthermore, in the non-nominal state of curve 21, current Imax does not make it possible to supply the maximal hydraulic flow rate Qmax any more. In other words, curve 21 corresponds to a deteriorated state of the servo valve.

It is known how to detect such a degraded state. However, on detection, the performances of the turbojet engine are already substantially affected.

There is thus a need for an effective method for monitoring a control device of a fuel metering valve of a turbojet engine, so as to be notably able to issue a request for of maintenance of this control device before the turbojet engine is made inoperative or non-effective.

There is a known monitoring method using a PID-type corrective network (PID for "Proportional-Integral-Derivative") and comprising a step for detecting a stabilized state, a step for determining a mean value of the control current during the detection of the stabilized state, and a step for comparing the said mean value with a predetermined threshold. This method makes it possible to prevent any actual failure of a system for actuating variable geometries. Nevertheless, this monitoring method does not make it possible to determine either the type of deterioration or the time when the failure will arise. It is thus impossible to optimize the maintenance operations so as to limit the downtime of the aircraft on which the device is mounted.

BACKGROUND OF THE INVENTION

With the view of eliminating at least some of these drawbacks, the invention relates to a method for monitoring a control device of a fuel metering valve of an aircraft turbojet engine, the control device supplying a control current (FMV_CUR) to a servo valve in order to modify the position (FMV_POS) of the fuel metering valve, the method comprising:

- a step for determining the position (FMV_POS) of the fuel metering valve during a flight of the aircraft;
- a step for determining the travelling speed of the fuel metering valve;
- a step for determining the control current (FMV_CUR) when the travelling speed of the fuel metering valve is zero;
- a step for calculating a mean control current (FMV_CURM) when the travelling speed of the fuel metering valve is zero, the mean control current (FMV_CURM) forming an indicator of deterioration of the control device;
- a step for comparing the deterioration indicator with a reference base of indicators with deterioration so as to infer the type of deterioration from it;
- a step for calculating an abnormality score for the deterioration indicator;
- a step for comparing the abnormality score with a decision threshold of abnormality characteristic of the type of deterioration; and
- a step for releasing an alarm in case of violation of the decision threshold of abnormality.

Thanks to the invention, it is possible to detect any deterioration of the control device of a fuel metering valve of a turbojet engine and characterize it. So, it is possible to detect whether the deterioration corresponds to a positive or negative drift of the control current.

Preferably, the deterioration indicator is normalized according to its standard deviation and average obtained over a plurality of flights during a learning phase. So, a relevant abnormality score that makes it possible to accurately characterize the type of deterioration is obtained.

According to a preferred aspect of the invention, the abnormality score of the deterioration indicator is a function of the absolute value of the said normalized deterioration indicator.

Preferentially, the reference base of indicators with deterioration comprises an indicator of deterioration of a positive drift and an indicator of deterioration of a negative drift.

According to an aspect of the invention, the method includes a step for comparing the evolution of the slope of the abnormality score with a threshold of maximal abnormality before failure. It is thus possible to advantageously foresee the term at which the failure is effectively going to arise. So, it is possible to make an early maintenance operation.

Preferably, the value of the threshold of maximal abnormality before failure is defined by learning during several no-deterioration flight cycles of an aircraft.

BRIEF DESCRIPTION OF THE DRAWINGS

The invention will be better understood while reading the following description which is set up only as an example and refers to the accompanying drawings wherein.

DETAILED DESCRIPTION

Afterwards the monitoring method is going to be explained in connection with a twin-shaft turbojet engine comprising a low-pressure body BP and a high-pressure body HP. Besides, the turbojet engine includes a fuel metering valve FMV which is controlled by a servo valve. The servo valve is controlled by means of a control current FMV_CUR as set out previously. The position of the fuel metering valve depends on the balance or rest control current supplied to the servo valve.

Figure 2:
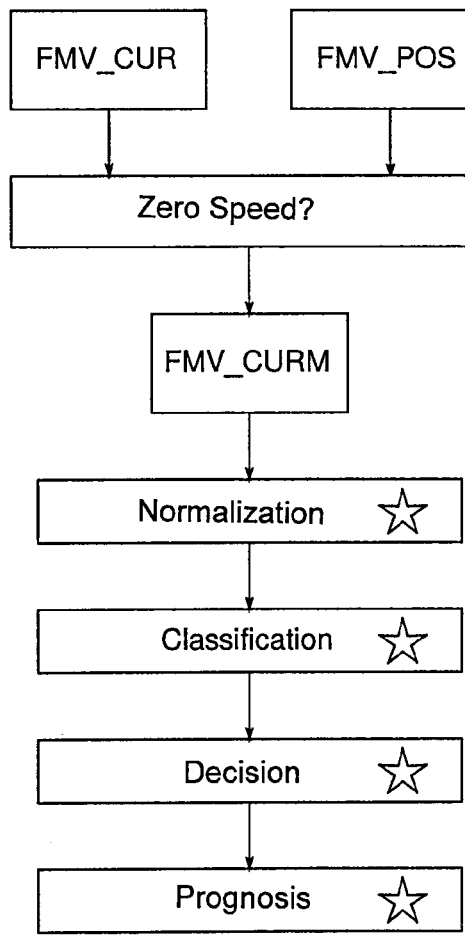
FIG. 2 is a schematic diagram of the monitoring method according to the invention.

The turbojet engine includes a control device of a fuel metering valve of a turbojet engine. In this example, the control device includes means for determining a variable representative of the control current FMV_CUR and a variable representative of the fuel metering valve position FMV_POS. So as to detect a positive or negative drift of the control current FMV_CUR, a monitoring method according to the invention is going to be explained in reference to FIG. 2 illustrating:

a step (A) of acquisition of variables;
a step (B) of processing of variables;
a step (C) of deterioration classification;
a step (D) of deterioration decision; and
a step (E) of failure forecast.

A. Acquisition of Variables

A first step of the monitoring method consists in acquiring a variable representative of the control current FMV_CUR and a variable representative of the fuel metering valve position FMV_POS.

In this example, the control device includes a servo valve for controlling the position of a fuel metering valve of the turbojet engine. Besides, the control device includes a fuel control loop which makes it possible to calculate the control current of the servo valve so as to reach the intended fuel flow. The value calculated by the control loop is acquired in order to acquire the variable representative of the control current FMV_CUR.

In this example, the variable representative of the fuel metering valve position FMV_POS is obtained by consolidation of two position measurements acquired by position sensors of a measuring chain. Preferably, the raw measurements acquired by the sensors undergo a pre-processing (area, deviation and integrity tests) which classically consists in removing the aberrant measurements by comparing them with the precision of the sensor or the physical limit of the sensor which achieved the measurement.

B. Processing of the Variables

According to the invention, the variable representative of the control current FMV_CUR is extracted only over a stabilized operating range of the turbojet engine in flight, in particular when the travelling speed of the fuel metering valve FMV is zero. The travelling speed of the fuel metering valve FMV is advantageously inferred from the position FMV_POS, an absence of variation of the position FMV_POS corresponding to a zero travelling speed of the fuel metering valve FMV.

In this exemplary embodiment, when the travelling speed is zero during a definite flight period, the average of the variable representative of the control current FMV_CUR is calculated over the said period so as to obtain a mean control current FMV_CURM.

The mean control current FMV_CURM forms a relevant deterioration indicator for monitoring a failure of a control device of a fuel metering valve FMV considering that any deterioration of the control current (a positive or negative drift) has an influence on the deterioration indicator, i.e. the mean control current FMV_CURM.

Besides, the mean control current FMV_CURM is independent from the position of the fuel metering valve FMV, the important thing being that the latter is stationary. The mean control current FMV_CURM is also independent from the flow of fuel injected into the turbojet engine or from the rotation speed of the high-pressure body. The mean control current FMV_CURM forms thus a sound indicator for the monitoring of a deterioration.

The evolutions of the deterioration indicator representative of the control current FMV_CURM (negative drift and positive drift) are defined by means of impact laws which are a function of the seriousness of the deterioration, here the drift intensity.

Simulations of fuel control loops in a turbojet engine showed that:

an additive variation of the control current FMV_CUR is translated into the same additive variation of the deterioration indicator, and that the variation of the indicator does not depend on the context, on the flow of fuel injected into the turbojet engine or on the rotation speed of the high-pressure body.

Afterwards, a plurality of acquisitions of the deterioration indicator (mean control current FMV_CURM of the fuel metering valve when the latter is stationary) is first of all achieved over a plurality of flights of the considered turbojet engine so as to form a normalized deterioration indicator. This learning phase makes it possible to form a normalization model of the deterioration indicator. In practice, the average and the standard deviation of the mean control current FMV_CURM at zero speed are calculated during this learning phase.

Then, during a monitoring phase, an acquisition of the deterioration indicator (mean control current FMV_CURM of the fuel metering valve when the latter is stationary) is achieved for a flight with potential deterioration. The deterioration indicator is normalized by centring the indicator and reducing it by means of the average and the standard deviation obtained during the learning phase.

C. Classification of the Deterioration Indicators

A reference base of indicators is formed in order to determine a deterioration of the balance current and the normalized deterioration indicator obtained further to the monitoring phase is compared with it. The previously set out impact laws for simulating deteriorations of determined intensity with deterioration indicators obtained from no-deterioration flights are used to form the reference indicators of the base.

In this example, the mean control current FMV_CURM may be degraded only by a positive drift and a negative drift. The reference base thus comprises only a reference indicator characteristic of a positive drift and a reference indicator characteristic of a negative drift. Preferably, the forming of the reference indicators with deterioration is obtained by learning.

To classify the deterioration indicator obtained during the monitoring flight, the said indicator is compared with both reference indicators so as to determine the most likely deterioration. Each deterioration indicator obtained during the monitoring flight is then associated with a type of deterioration, i.e. a positive drift or a negative drift. A comparison based on the geodesic distances between the deterioration indicator obtained during the monitoring flight and the reference indicators is achieved as it is known from patent application FR 2 939 924.

D. Deterioration Decision

The abnormality score of the normalized deterioration indicator obtained during the monitoring flight is calculated in order to detect a deterioration. In this example, the abnormality score is a function of the norm of the deterioration indicator, i.e. of the absolute value of the mean control current FMV_CURM. According to an aspect of the invention, the abnormality score is calculated over a rolling time period of five consecutive flights.

The abnormality score of the deterioration indicator is then compared with a decision threshold of abnormality that is characteristic of the type of deterioration which was determined during the classification step (positive drift threshold or negative drift threshold). In a known manner, decision thresholds of abnormality are obtained by learning over a plurality of flights. In case of violation of the said decision threshold of abnormality, the observed deterioration is considered to be established.

These decision thresholds of abnormality are determined according to:
- the distribution of the abnormality score observed during the first learning flights,
- the per-flight probability of appearance of a positive or negative drift,
- a possible confirmation strategy.

E. Failure Forecast

This step makes it advantageously possible to forecast from which moment on a deterioration of the control current (negative or positive drift) will result in an actual failure.

To do this, a threshold of maximal abnormality before failure corresponding to the abnormality score for a deterioration of maximal intensity is obtained, preferably by learning. In other words, the threshold of maximal abnormality before failure corresponds to the score of the deterioration indicator very little time before the actual appearance of the failure.

Figure 1:
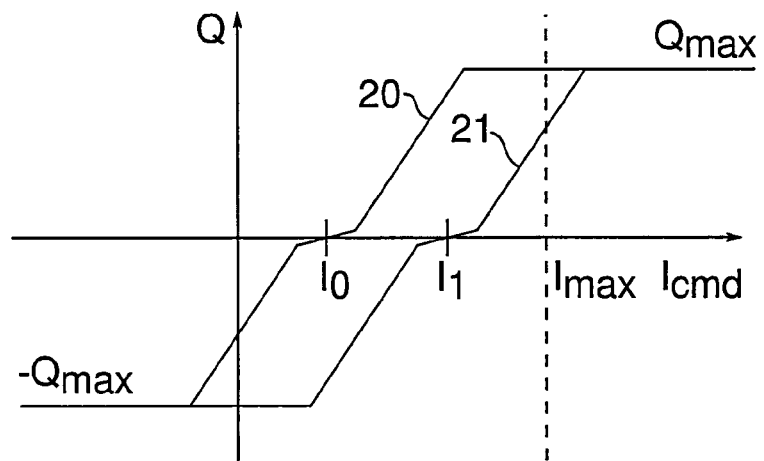
FIG. 1 is a graph which shows an operating curve of a servo valve.

These thresholds of maximal abnormality before failure are determined according to the maximal translations of the control current beyond which the extreme flows of the fuel metering valve (Qmax and −Qmax, see FIG. 1) are not reachable any more. Thresholds of maximal abnormality before failure are thus random variables.

Then the abnormality score of the deterioration indicator obtained during the monitoring is calculated and compared with the threshold of maximal abnormality before failure. Then the evolution of the abnormality score is analyzed so as to determine from which term on it is going to exceed the threshold of maximal abnormality before failure, i.e. at which time a deterioration is going to turn into a failure. According to the invention, the decision whether a failure exists or not is based on the evolution of the abnormality score, the evolution of its average or the evolution of its variation (measurement of the slope of the abnormality score).

According to an aspect of the invention, it is desirable to obtain the probability of failure at a given term. To do this, the distribution of the probability of violation of the threshold of maximal abnormality before failure is analyzed over the time, for instance over a certain number of flights.

Figure 3:
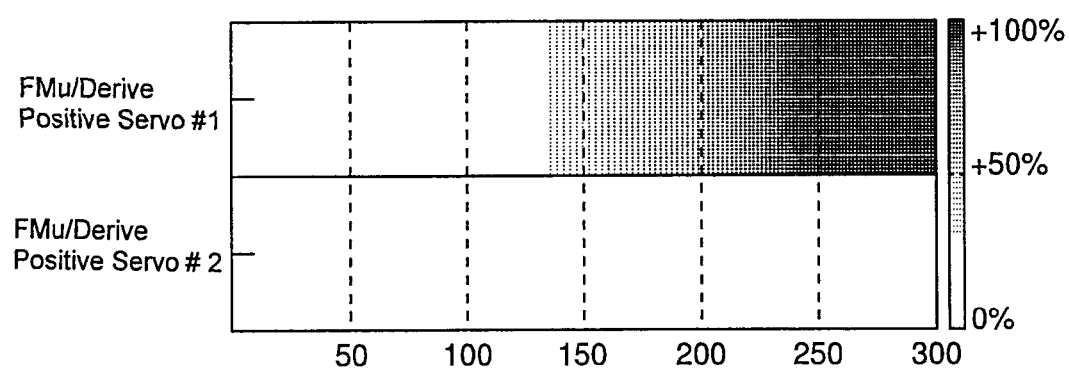
FIG. 3 shows a decision display for analyzing the deteriorations of the control device of the fuel metering valve.

As an example, referring to the table of FIG. 3, a visual representation of the deterioration probability (colour of the table) for each type of deterioration (positive drift or negative drift) according to the number of flights (the number of flights being indicated by the columns of the table) is obtained.

So, in this example, a positive drift of the control current FMC_CUR is detected. Its probability of appearance increases importantly from flight N°200 on and is almost sure from flight N°230 on. So, it is possible to predict the term of the failure thanks to the previously explained method even before the failure arises and even before the turbojet engine requires a maintenance operation.

Advantageously, if an operation of maintenance of the turbojet engine is already scheduled for flight N°210, the control device of the servo valve can be replaced. By grouping together the maintenance operations, the availability of the aircraft is increased, which is very advantageous.

Several learning phases for obtaining, for instance, models for normalizing the deterioration indicators (standard deviation and average), reference indicators, decision thresholds of abnormality and thresholds of maximal abnormality before failure were previously set out. Preferably, the learning phases are characteristic of each turbojet engine and are renewed after each maintenance step so as to precisely follow the evolution of the state of the turbojet engine. The steps of the method including a learning phase are marked with a star in FIG. 2.

The invention claimed is:

1. Method for monitoring a control device of a fuel metering valve of an aircraft turbojet engine, the control device supplying a control current to a servo valve in order to modify a position of the fuel metering valve, the method comprising:
   determining the position of the fuel metering valve during a flight of the aircraft;
   determining the travelling speed of the fuel metering valve based on said position of the fuel metering valve;
   determining the control current when the travelling speed of the fuel metering valve is zero due to an absence in variation of said position of the fuel metering value;
   calculating a mean control current when the travelling speed of the fuel metering valve is zero, the mean control current forming an indicator of deterioration in function of the control device;
   comparing the deterioration indicator with a reference base of indicators of deterioration so as to infer a type of deterioration in function of the control device;
   calculating an abnormality score for the deterioration indicator;
   comparing the abnormality score with a decision threshold of abnormality that is characteristic of the type of deterioration; and releasing an alarm in case of violation of the decision threshold of abnormality.

2. Method according to claim 1, in which the reference base of indicators of deterioration comprises an indicator of deterioration of a positive drift, and an indicator of deterioration of a negative drift.

3. Method according to claim 1, wherein the deterioration indicator is normalized according to standard deviation and average value of the deterioration indicator obtained over a plurality of flights during a learning phase.

4. Method according to claim 3, in which the abnormality score of the deterioration indicator is a function of the absolute value of said normalized deterioration indicator.

5. Method according to claim 1, further comprising comparing the evolution of the slope of the abnormality score with a threshold of maximal abnormality before failure.

6. Method according to claim 5, wherein the value of the threshold of maximal abnormality before failure is defined by learning during several no-deterioration flight cycles of an aircraft.

* * * * *